United States Patent Office 3,459,532
Patented Aug. 5, 1969

3,459,532
METHOD OF INCREASING SEED YIELD BY THE APPLICATION OF A MIXTURE OF TRIIODOBENZOIC ACID AND FERTILIZER
Thomas J. Army, Northbrook, Ill., and Alvin J. Ohlrogge, West Lafayette, Ind.; said Thomas J. Army assignor to International Minerals & Chemical Corporation, a corporation of New York, and said Alvin J. Ohlrogge assignor to Purdue Research Foundation, a corporation of Indiana
No Drawing. Filed Aug. 10, 1966, Ser. No. 571,424
Int. Cl. A01c 21/00; C05g 3/00
U.S. Cl. 71—80                          16 Claims

ABSTRACT OF THE DISCLOSURE

Seed yield of beans and peas is increased by placing a compound having an active 2,3,5-triiodobenzoic acid moiety in the soil as a band parallel to the crop row at a distance of about 1 to 6 inches from the row and a depth of about 1 to 5 inches in the soil in admixture with a nitrogen and phosphorus-containing fertilizer in an amount to provide about one-half to four ounces per acre of the material calculated as 2,3,5-triiodobenzoic acid equivalent.

---

The prior art recognizes that the yield of certain legumes, particularly soybeans, can be increased by spraying on the foliage of the growing plants, at an appropriate growth stage, a closely controlled quantity of the antiauxin 2,3,5-triiodobenzoic acid (TIBA). Typical of such prior art is a publication by Dr. I. C. Anderson, published Jan. 11, 1963 in the Proceedings of the 15th Annual Iowa State University Fertilizer Industry Representatives Conference. Experiments have also been reported in which TIBA has been mixed with the soil at the base of the plant stem, and applied to the soil as a liquid drench. See "The Effect of 2,3,5-Triiodobenzoic Acid on the Growth and Flowering of Soybeans," by Dr. A. W. Galston, American Journal of Botany, vol. 34, page 356. While certain morphological alterations of the plants were observed, no change in ultimate seed yield was noted or suggested. The plants were sacrificed shortly after treatment, rather than grown to harvest.

The treatment of soybeans, edible beans, or edible peas by foliar application of TIBA, in addition to increasing seed yield under some conditions, worked startling morphological changes in the plant, some of which are beneficial and some of which are adverse. For example, plants treated with TIBA exhibited marked resistance to lodging. On the other hand, the average size of the seed produced is markedly decreased, even though the total yield of seed is increased. The time of application and amount of TIBA applied by foliar spray has been found to be critical. Variations of little as ten days in time of treatment have been found, at least under some conditions, to seriously stunt the plant and substantially reduce the seed yield ultimately obtained.

It is an object of this invention to provide a method for increasing the yield and reduce lodging of legumes, especially soybeans, edible beans, and edible peas by making available to the growing plant TIBA or a biologically active derivative thereof.

Another object of this invention is to provide a method for treating soybeans, edible beans or edible peas, with TIBA in a manner to provide relative intensitivity in the time of application and the amount of TIBA applied.

Another object of this invention is to provide a method for treating legumes to increase seed yield while avoiding concomitant unfavorable morphological effects in the plant.

Still another object of this invention is to provide a method for controlling the availability of TIBA to the plant after application.

Briefly, this invention involves a method for growing soybeans, edible beans and edible peas as row crops comprising placing into the soil a band substantially parallel to the crop row and at a distance of about 1 to 6 inches therefrom and at a depth of about 1 to 5 inches in the soil, said band containing 2,3,5-triiodobenzoic acid or a biologically active metal salt, ammonium salt, ester, or amide, or mixtures thereof, in an amount effective to increase seed yield, said band being placed at a growth stage prior to the time at which the crop reaches 10% flower, growing the crop to maturity and harvesting it.

In a further embodiment the invention comprises a method in which the band includes a phosphate-containing fertilizer and also preferably includes a nitrogen-containing fertilizer.

In another embodiment the invention relates to a novel fertilizer composition containing about 15 to about 150 lbs. of phosphorus calculated as $P_2O_5$, preferably also about 2 to about 30 lbs. of nitrogen calculated as nitrogen, and about ½ to about 4 oz. of 2,3,5-triiodobenzoic acid or a biologically active metal salt, ammonium salt, ester, or amide thereof, or mixtures thereof, calculated as 2,3,5-triiodobenzoic acid equivalent, per unit of said fertilizer.

Crops susceptible to treatment in accordance with this invention are soybeans, edible beans, and edible peas. The method of this invention is effective on a wide number of soybean varieties, particularly soybeans of the northern or indeterminant type. Edible beans and edible peas susceptible to treatment in accordance with this invention include those of the genus Phaseolus leguminosae. While the invention will be described in detail with reference to soybeans, it should be understood that the teachings are also applicable to the growing of edible beans and edible peas.

The TIBA can be used in the form of derivatives which retain their biological activity, such as the metal salts, ammonium salts, amides, or esters thereof. Since the acid or its anions are the active biological moiety, it is evident that any derivative or salt which yields the acid or anion through contact with the plant, soil or atmosphere can be used. While all such derivatives and salts of the 2,3,5-triiodobenzoic acid are operable as yield increasing agents, since they are converted to the acid or its anion, some groups of compositions are preferred to others for particular types of application and methods of treatment, for reasons of cost, optimal effectiveness, safety, and ease of application.

For instance, where an aqueous carrier is to be used, salts, preferably water-soluble salts, are desirable. Examples of suitable salts include, but are not limited to sodium, potassium, lithium, calcium, magnesium, strontium, iron, zinc, nickel, chromium, ammonium, hydroxylammonium, hydrazinium, mono-, di-, tri- and tetraalkylammonium such as monomethylammonium, monoethylammonium, dimethyl-, diethyl-, dipropyl-, dibutylammonium, trimethyl-, tetramethyl-, triethyl-, tripropyl-, tributylammonium salts; also the mono-, di- and triethanolammonium and mono-, di-, and tri-propanolammonium salts of the aforesaid 2,3,5-triiodobenzoic acid. The preferred method for aqueous application is the use of a water-soluble composition selected from the group consisting of the sodium, potassium, lithium, ammonium, monoalkylammonium, dialkylammonium, trialkylammonium, tetraalkylammonium, monoalkanolammonium, dialkanolammonium, trialkanolammonium, tetraalkanolammonium, morpholinium, and piperidinium salts of the aforementioned 2,3,5-triiodobenzoic acid, water and optional conditioning adjuvants.

However, oil-soluble derivatives may be employed in powder carriers, in organic carriers, in aqueous dispersions, or in admixture with fertilizers. These oil-soluble derivatives are especially valuable when made up in organic solvents such as higher alcohols, ketones, esters, and especially mineral and vegetable oils having relatively low phytotoxicity. Examples of suitable esters include among many others: methyl, ethyl propyl, isopropyl, butyl, isobutyls, amyl, isoamyls, hexyl, isohexyls, heptyl, isoheptyls, octyl, isooctyls, ethylhexyl, nonyl, isononyl, decyl, isodecyls, cyclopentyl, cyclohexyl, allyl, lauryl, 1,2-ethylenebis, 2-chloroethyl, glyceryl (mono-, bis- or tris-), methoxyethyl, ethoxyethyl, butoxyethyl, ethoxyethoxyethyl, butoxyethoxyethyl, tetrahydrofurfuryl, benzyl.

Examples of oil-soluble amines are those possessing about six or more carbon atoms, such as for example, tripropyl, dibutyl, tributyl, cyclohexyl, hexyl, diamyl, triamyl, dihexyl, dioctyl, trioctyl, ethylhexyl, di(2-ethylhexyl), decyl, didecyl, tridecyl, lauryl, dilauryl, trilauryl, methyl lauryl, dimethyl lauryl, stearyl, dimethylstearyl amines, also coco-, tallow-, and rosin-amines.

In practicing the method of this invention, the TIBA compound is preferably applied as a solution, dispersion, emulsion, or in admixture with a suitable agronomic carrier. The carrier may be aqueous, organic, or a solid pulverulent material. Where the compound is difficultly soluble or dispersible in water, it can first be dissolved in alcohol, such as methanol or ethanol, to form a concentrated solution which is then mixed with a much larger volume of water to form a dispersion or solution of the desired concentration. As used herein, the term "dispersion" is intended to cover true solutions, colloidal dispersions, and emulsions where the TIBA compound is dissolved or dispersed therein.

The TIBA compound may be formulated in a suitable carrier merely by dissolving it in an agronomically inert liquid or a nutrient liquid. In the preferred practice of this invention, however, the TIBA compound will be dissolved, dispersed, or admixed in a fertilizer which includes at least an available phosphate source, and preferably also an available nitrogen source. Other nutrients may also be included. The fertilizer composition to which the TIBA compound is added may be solid or liquid, granular or pulverulent. Especially preferred are aqueous fertilizer mediums of the solution or slurry type or conventional solid fertilizers. The nitrogen in the fertilizer material is preferably ammoniacal nitrogen. Exemplary suitable materials for formulating the fertilizer are ammonium nitrate, monoammonium phosphate, diammonium phosphate, ammonium polyphosphate, ammonium sulphate, triple superphosphate, ammoniated triple superphosphate, and ordinary superphosphate. Potassic materials, such as muriate of potash, and trace elements, may be included. The TIBA compound may be introduced to a liquid fertilizer composition as a soluble salt, for example, the dimethyl amine or sodium salt of TIBA, or by first dissolving the TIBA compound in a water-soluble organic liquid. The TIBA may be incorporated in dry fertilizer materials by spraying onto the fertilizer material, in the blending or granulation operation, an aqueous or organic liquid containing dissolved or dispersed TIBA compound. For example, the sodium salt of TIBA may be dissolved in water and this solution sprayed onto diammonium phosphate as it is granulated in a rotary reactor. The TIBA could also be incorporated by dissolving it in aqueous ammonia employed in the ammoniation of superphosphate materials or in the manufacture of diammonium phosphate. The TIBA compound may also be mixed in non-nutrient, dry carriers, such as ground corncobs, by dissolving the TIBA compound in a liquid as aforedescribed and spraying the liquid on the solid carrier.

It is preferred that the fertilizer compositions of this invention contain about 2 to about 30 lbs. of available ammoniacal nitrogen calculated as nitrogen, about 15 to about 150 lbs. of available phosphorus calculated as $P_2O_5$, and about ½ to 4 oz. of the TIBA compound, calculated as TIBA equivalent per unit of fertilizer. The magnitude of the aforementioned unit is not at all critical, since it merely indicates the degree of dilution of the nutrients and TIBA compound in the fertilizer composition, and accordingly, the tonnage of fertilizer composition which must be applied to achieve the desired nutrient and TIBA compound levels in the soil. The ratio of nitrogen to phosphorus calculated as nitrogen and $P_2O_5$, will preferably be in the range of about 1:2 to about 1:5. The fertilizer composition may beneficially contain about 5 to about 100 lbs. of potassium, calculated as $K_2O$, per unit of fertilizer.

In practicing the method of this invention the field is planted to soybeans, edible beans, or edible peas at an appropriate row spacing and approprate plant spacing, such as, for example, a row width of about 30 inches and a plant spacing of about 6 to 12 plants per foot. The TIBA is applied as a band parallel to the plant row. The band is placed in the soil about 1 to about 6 inches to the side of the row, and preferably about 3 inches to the side of the row. The band is placed at a depth of 1 to 5 inches below the surface of the soil, and preferably at a depth of about 3 inches below the surface of the soil. The TIBA compound-containing band is placed at a growth stage prior to the time when the crop reaches 10% flower, this is, when 10% of the individual plants have some blooms. A preferred time for application is at about the growth stage when the plants have 3 trifoliated leaves expanded, but it may be less costly to apply the band concomitantly with planting.

The TIBA compound is applied in the band in an amount sufficient to provide about ½ to about 4 oz. of TIBA compound (calculated as TIBA equivalent) per acre. The preferred amount is about 1 oz. for a plant population produced by a 30 inch row spacing and a plant spacing of 6 plants per foot. For the same row spacing and a plant spacing of 12 plants per foot, the preferred amount of TIBA compound would be 2 oz. per acre.

In the preferred method of carrying out this invention the band contains both a TIBA compound and a fertilizer which contains at least available phosphate ($P_2O_5$) in the amount of 15 to 150 lbs. per acre, and preferably available ammoniacal nitrogen in the amount of 2 to 30 lbs. per acre. The TIBA and fertilizer are preferably mixed and applied as a single homogeneous band, but this is not essential. It is sufficient that the TIBA compound be applied as a band and that the phosphate and/or nitrogen be adjacent to the TIBA compound in the soil.

In the preferred embodiment of this invention a fertilizer composition as aforedescribed containing ammoniacal nitrogen, phosphate, and a TIBA compound, all as a homogeneous mixture, is applied as a band. The band may be placed in the soil by conventional techniques and using conventional machinery.

It has been found, quite unexpectedly, that by applying the TIBA compound to the soil as a band rather than applying the TIBA compound to the crop as a foliar spray, as taught by the prior art, certain disadvantages of the prior art technique are avoided. Specifically, extreme sensitivity to the time of application and the amount of TIBA compound employed, which characterized the prior art technique, is avoided, the crop being far more tolerant to variations in time and amount of application when the TIBA compound is applied in the soil as a band. It has further been found that the reduction in the size of individual seeds harvested which characterized the treatment of soybeans with TIBA by the prior art foliar application technique, is completely eliminated by the method of this invention.

It has further been found that the increase in seed yield achievable by the use of TIBA is substantially increased when the TIBA compound is applied adjacent to a fertilizer band which includes suitable amounts of nitrogen and phosphorus as before described, as compared to a technique in which the identical quantities of nutrients and TIBA compound are applied at identical spacings and under identical conditions except that the materials are applied as two bands on opposite sides of the crop row, i.e., the nutrients and TIBA compounds are not adjacent in the soil.

EXAMPLES

Plot preparation

Preliminary preparation of the soil, a Chalmers silty clay loam, consisted of a fall application of 200 pounds/acre of 0-0-60 and the soil which had been in corn in the previous year was fall plowed. In the spring another 200 pounds/acre of 0-0-60 was disced into the soil. Previous to planting the soil was again worked with a cultipacker and was then ready for planting.

Example Group I

The main blocks of plots in this experiment were three sideband fertilizations of 0-0-0, 0-50-50, and 10-50-50 pounds/acre of N, $P_2O_5$, and $K_2O$, respectively. Within these main blocks were sub-blocks of application times. These application times were: (1) at planting, (2) at the second trifoliate stage of growth, and (3) at the fifth trifoliate or initiation of bloom stage of growth. Within each application time block there were four plots of TIBA rates—0, 20, 60, and 180 grams of TIBA per acre. All treatments were replicated four times.

A plot in these experiments consisted of four 30-inch rows wide (10 feet) by thirty feet long. A four row planter equipped endless belt fertilizer application units was used to plant the Harosoy-63 variety of soybeans. These soybeans were planted at the rate of eighty pounds/acre of approximately eighty percent germination seed stock. Planting took place on May 18.

Example Group II

This experiment consisted of: (1) two fertilizations of 0-50-50 and 10-50-50 pounds/acre of N, $P_2O_5$, and $K_2O$, respectively, (2) two times of application corresponding to the second and third times of application in the previously described experiment, (3) the use of two types of bands—(a) one band containing both TIBA and fertilizer and the other band containing nothing and (b) one band containing TIBA and the other only fertilizer, and (4) the 60 grams/acre rate of TIBA was the only rate of TIBA used. This factorial experiment was replicated four times. To maintain uniform mechanical effects the disc applicator passed by on both sides of the row even though the design called for one band to contain nothing. All bands in both experiments were placed approximately 3 inches to the sides of the row and 3 inches below the soil surface.

After the soybeans had emerged from the soil and had grown to the second trifoliate stage of growth, application 2 was applied. This application occurred on June 15, which was 30 days after planting. Both experiments were treated on the same day. After waiting for the plants to grow to the fifth trifoliate stage of growth and at the time when 10% of the plants had at least one bloom, the third application was applied to both experiments. This application date was June 25, or 40 days after planting.

Watching the plants throughout the summer, very little response to treatment was observed. All plants in both experiments lodged on July 10 due to a high wind and hard rain received the previous night. After this the plants remained lodged and no other visual signs of response to the treatments were observed.

On October 21 population counts were taken throughout both experiments. The data showed a population of 156,000 plants per acre with no differences between experiments. On October 28 and 29 the plots were hand harvested. Two harvest samples were taken from each plot. A harvest sample consisted of twenty feet of row from each of the center two rows of the four row plots. The two sub-samples were then averaged to determine the plot yield.

Results

The plot yelds and seed weights/100 seeds for both example groups are given in Tablets I through IV.

TABLE I.—SOIL APPLICATION STUDY YIELDS [Bu./acre] [1]

| App. time | Fert. | TIBA rate | Replications | | | | Sum | Mean |
|---|---|---|---|---|---|---|---|---|
| | | | 1 | 2 | 3 | 4 | | |
| 1 | 0-0-0 | 0 | 41.3 | 46.7 | 50.3 | 52.9 | 191.2 | 47.8 |
| | | 20 | 46.8 | 57.0 | 50.4 | 53.4 | 207.6 | 51.9 |
| | | 60 | 50.1 | 53.1 | 44.9 | 47.2 | 195.3 | 48.8 |
| | | 180 | 42.6 | 47.0 | 49.8 | 44.3 | 183.7 | 45.9 |
| 1 | 0-50-50 | 0 | 45.7 | 45.3 | 50.3 | 38.0 | 179.3 | 44.8 |
| | | 20 | 45.7 | 52.3 | 54.7 | 46.2 | 198.9 | 49.7 |
| | | 60 | 41.9 | 45.2 | 49.2 | 49.2 | 185.5 | 46.4 |
| | | 180 | 45.7 | 53.3 | 48.5 | 45.3 | 192.8 | 48.2 |
| 1 | 10-50-50 | 0 | 46.0 | 41.8 | 55.2 | 49.6 | 192.6 | 48.2 |
| | | 20 | 41.4 | 47.6 | 47.2 | 50.4 | 186.6 | 46.7 |
| | | 60 | 43.3 | 50.2 | 48.9 | 53.9 | 196.3 | 49.1 |
| | | 180 | 50.8 | 38.2 | 53.0 | 58.9 | 200.9 | 50.2 |
| 2 | 0-0-0 | 0 | 51.1 | 52.6 | 49.3 | 51.5 | 204.5 | 51.1 |
| | | 20 | 49.8 | 52.1 | 48.3 | 51.5 | 201.7 | 50.4 |
| | | 60 | 52.0 | 56.8 | 53.7 | 53.0 | 215.5 | 53.9 |
| | | 180 | 44.7 | 55.7 | 47.5 | 58.2 | 206.1 | 51.5 |
| 2 | 0-50-50 | 0 | 42.3 | 45.4 | 52.1 | 48.3 | 188.1 | 47.0 |
| | | 20 | 46.3 | 44.8 | 52.0 | 43.2 | 186.3 | 46.6 |
| | | 60 | 49.7 | 53.6 | 49.8 | 52.5 | 205.6 | 51.4 |
| | | 180 | 47.4 | 49.3 | 54.5 | 51.9 | 203.1 | 50.8 |
| 2 | 10-50-50 | 0 | 45.1 | 51.1 | 54.3 | 57.6 | 208.1 | 52.0 |
| | | 20 | 53.0 | 57.5 | 54.9 | 57.6 | 223.0 | 55.8 |
| | | 60 | 49.6 | 54.5 | 59.6 | 50.0 | 213.7 | 53.4 |
| | | 180 | 45.9 | 49.4 | 49.6 | 59.9 | 204.8 | 51.2 |
| 3 | 0-0-0 | 0 | 46.1 | 45.8 | 46.4 | 53.3 | 191.6 | 47.9 |
| | | 20 | 53.5 | 54.1 | 51.1 | 48.7 | 207.4 | 51.9 |
| | | 60 | 42.8 | 46.7 | 53.1 | 53.7 | 196.3 | 49.1 |
| | | 180 | 50.8 | 53.7 | 49.2 | 58.4 | 212.1 | 43.0 |
| 3 | 0-50-50 | 0 | 45.4 | 48.9 | 51.9 | 44.7 | 190.9 | 47.7 |
| | | 20 | 42.4 | 45.4 | 57.5 | 49.8 | 195.1 | 48.8 |
| | | 60 | 40.4 | 50.4 | 48.0 | 45.0 | 183.8 | 46.0 |
| | | 180 | 50.2 | 47.4 | 51.9 | 43.0 | 192.5 | 48.1 |
| 3 | 10-50-50 | 0 | 48.6 | 45.6 | 52.5 | 53.6 | 200.3 | 50.1 |
| | | 20 | 52.3 | 50.0 | 58.9 | 57.6 | 218.8 | 54.7 |
| | | 60 | 45.2 | 54.4 | 52.6 | 52.9 | 205.1 | 51.3 |
| | | 180 | 53.4 | 49.4 | 52.3 | 51.0 | 206.1 | 51.5 |

[1] At 13% moisture.

TABLE II.—SOIL APPLICATION STUDY SEED WEIGHT ANALYSES

[Seed weight (gm./100 seeds)]

| App. time | Fert. | TIBA | Replications | | | | Sum | Mean |
|---|---|---|---|---|---|---|---|---|
| | | | 1 | 2 | 3 | 4 | | |
| 1 | 0-0-0 | 0 | 18.85 | 20.04 | 17.75 | 18.71 | 75.35 | 18.84 |
| | | 20 | 19.18 | 19.19 | 18.79 | 18.28 | 75.44 | 18.86 |
| | | 60 | 19.09 | 19.70 | 18.52 | 18.41 | 75.72 | 18.93 |
| | | 180 | 18.44 | 19.63 | 18.14 | 18.74 | 74.95 | 18.74 |
| 1 | 0-50-50 | 0 | 18.60 | 18.14 | 18.41 | 18.02 | 73.17 | 18.29 |
| | | 20 | 18.06 | 18.28 | 18.21 | 19.09 | 73.64 | 18.41 |
| | | 60 | 18.57 | 17.70 | 18.95 | 18.06 | 73.28 | 18.32 |
| | | 180 | 18.61 | 18.27 | 18.34 | 17.25 | 73.47 | 18.12 |
| 1 | 10-50-50 | 0 | 17.85 | 18.18 | 19.30 | 20.10 | 75.43 | 18.86 |
| | | 20 | 18.43 | 17.56 | 19.17 | 20.15 | 75.31 | 18.83 |
| | | 60 | 18.67 | 18.29 | 18.70 | 19.18 | 74.84 | 18.71 |
| | | 180 | 18.36 | 18.15 | 18.55 | 18.31 | 73.37 | 18.34 |
| 2 | 0-0-0 | 0 | 18.91 | 18.81 | 18.14 | 18.75 | 74.61 | 18.65 |
| | | 20 | 18.71 | 19.05 | 18.21 | 19.01 | 74.98 | 18.75 |
| | | 60 | 18.37 | 18.84 | 18.49 | 18.72 | 74.42 | 18.61 |
| | | 180 | 18.43 | 18.71 | 17.79 | 18.83 | 73.76 | 18.40 |
| 2 | 0-50-50 | 0 | 18.74 | 19.23 | 18.57 | 18.55 | 75.09 | 18.77 |
| | | 20 | 18.74 | 18.74 | 19.13 | 18.57 | 75.18 | 18.80 |
| | | 60 | 18.37 | 18.30 | 18.68 | 18.18 | 73.53 | 18.38 |
| | | 180 | 17.40 | 17.77 | 18.97 | 18.17 | 72.31 | 18.08 |
| 2 | 10-50-50 | 0 | 19.19 | 19.00 | 19.30 | 19.50 | 76.99 | 19.25 |
| | | 20 | 18.13 | 18.72 | 18.78 | 18.47 | 74.10 | 18.53 |
| | | 60 | 18.39 | 18.46 | 18.48 | 18.22 | 73.55 | 18.39 |
| | | 180 | 18.04 | 18.40 | 18.47 | 19.59 | 74.50 | 18.63 |
| 3 | 0-0-0 | 0 | 18.56 | 18.37 | 18.38 | 19.08 | 74.39 | 18.60 |
| | | 20 | 19.14 | 20.38 | 19.09 | 18.53 | 77.14 | 19.29 |
| | | 60 | 17.96 | 18.73 | 18.66 | 18.68 | 74.03 | 18.51 |
| | | 180 | 18.35 | 18.56 | 18.24 | 18.71 | 73.86 | 18.47 |
| 3 | 0-50-50 | 0 | 18.07 | 18.32 | 18.66 | 17.69 | 72.74 | 18.19 |
| | | 20 | 18.14 | 18.47 | 19.16 | 18.71 | 74.48 | 18.62 |
| | | 60 | 17.49 | 18.63 | 18.14 | 17.73 | 71.99 | 18.00 |
| | | 180 | 19.01 | 18.64 | 19.01 | 17.42 | 74.08 | 18.52 |
| 3 | 10-50-50 | 0 | 18.31 | 18.01 | 18.90 | 19.06 | 74.28 | 18.57 |
| | | 20 | 18.67 | 18.21 | 19.81 | 19.24 | 75.93 | 18.98 |
| | | 60 | 18.33 | 18.83 | 18.72 | 18.76 | 74.64 | 18.66 |
| | | 180 | 19.01 | 18.21 | 18.95 | 18.78 | 74.95 | 18.74 |

TABLE III.—SEPARATE BANDS vs. COMBINED BAND STUDY YIELDS

[Bu./acre] [1]

| App. time | Band type | Fert. | TIBA, gms./A | Replications | | | | Sum | Mean |
|---|---|---|---|---|---|---|---|---|---|
| | | | | 1 | 2 | 3 | 4 | | |
| 2 | Separated | 0-50-50 | 60 | 54.6 | 49.8 | 50.2 | 52.0 | 206.6 | 51.7 |
| 2 | do | 10-50-50 | 60 | 51.2 | 54.9 | 51.3 | 50.0 | 207.4 | 51.9 |
| 2 | Combined | 0-50-50 | 60 | 64.1 | 44.6 | 50.5 | 52.3 | 211.5 | 52.9 |
| 2 | do | 10-50-50 | 60 | 54.5 | 63.3 | 53.6 | 68.6 | 240.0 | 60.0 |
| 3 | Separated | 0-50-50 | 60 | 43.8 | 51.2 | 53.6 | 44.1 | 192.7 | 48.2 |
| 3 | do | 10-50-50 | 60 | 47.9 | 46.9 | 46.2 | 44.3 | 185.3 | 46.3 |
| 3 | Combined | 0-50-50 | 60 | 50.3 | 49.4 | 48.0 | 50.6 | 198.3 | 49.6 |
| 3 | do | 10-50-50 | 60 | 50.2 | 59.0 | 52.3 | 53.6 | 215.1 | 53.8 |

[1] At 13% moisture.

TABLE IV.—SEPARATE BANDS vs. COMBINED BAND STUDY, SEED WEIGHTS

[Gm./100 seeds]

| App. Time | Band Type | Fert. | Replications | | | | Sum | Mean |
|---|---|---|---|---|---|---|---|---|
| | | | 1 | 2 | 3 | 4 | | |
| 2 | Separated | 0-50-50 | 19.08 | 19.54 | 18.92 | 18.67 | 76.21 | 19.05 |
| 2 | do | 10-50-50 | 19.70 | 19.26 | 18.64 | 18.70 | 76.30 | 19.08 |
| 2 | Combined | 0-50-50 | 18.58 | 19.29 | 19.16 | 19.16 | 76.19 | 19.05 |
| 2 | do | 10-50-50 | 19.42 | 19.55 | 19.11 | 18.90 | 76.98 | 19.25 |
| 3 | Separated | 0-50-50 | 18.37 | 19.20 | 19.00 | 19.25 | 75.82 | 18.96 |
| 3 | do | 10-50-50 | 19.26 | 19.49 | 19.31 | 19.17 | 77.23 | 19.31 |
| 3 | Combined | 0-50-50 | 19.17 | 19.88 | 18.64 | 18.49 | 76.18 | 19.05 |
| 3 | do | 10-50-50 | 19.24 | 18.81 | 19.42 | 18.41 | 75.88 | 18.97 |

It will be apparent from the foregoing data that an increase in seed yield is attainable by the method of this invention, that this increase is enhanced by applying the TIBA compound adjacent to a fertilizer band, and that the average seed size at harvest is not substantially altered by the method of this invention.

While the invention has been described with special emphasis by the preferred embodiments thereof and has been illustrated by specific examples, it will be understood that, within the scope of the appended claims, the invention can be practiced other than as described.

We claim:

1. The method of growing soybeans, edible beans and edible peas as a row crop comprising placing into the soil a band substantially parallel to the crop row at a distance of about 1 to about 6 inches from the crop row and at a depth of about 1 to about 6 inches in the soil, said band being placed at a growth stage prior to the time the crop reaches 10% flower, growing the crop to maturity and harvesting it, said band containing a phosphorus-containing fertilizer in an amount to provide about 15 to about 150 pounds per acre, calculated as available $P_2O_5$, and a material selected from the group consisting of 2,3,5-triiodobenzoic acid, biologically active metal salts thereof, biologically active ammonium salts thereof, biologically active esters thereof, bilogically active amides thereof, and mixtures of the foregoing in an amount to provide ½ to 4 ounces thereof per acre, calculated as 2,3,5-triiodobenzoic acid equivalent.

2. The method in accordance with claim 1 in which said band is applied at about the growth stage when the plants have 3 trifoliated leaves expanded.

3. The method in accordance with claim 1 in which said band contains said material in an amount to provide about 1 to about 2 oz. thereof per acre, calculated as 2,3,5-triiodobenzoic acid equivalent.

4. The method in accordance with claim 3 in which said band is placed about 3 inches from the row and at a depth of about 3 inches in the soil.

5. The method in accordance with claim 4 in which said material is 2,3,5-triiodobenzoic acid.

6. The method in accordance with claim 1 in which said band contains nitrogen-containing fertilizer in the amount to provide about 2 to about 30 lbs. of nitrogen per acre.

7. The method in accordance with claim 6 in which said band is applied at about the growth stage when said plants have 3 trifoliated leaves expanded.

8. The method in accordance with claim 6 in which said band contains said material in an amount to provide about 1 to about 2 oz. thereof per acr, calculated as 2,3,5-triiodobenzoic acid equivalent.

9. The method in accordance with claim 8 in which said band is placed about 3 inches from the row and at a depth of about 3 inches in the soil.

10. The method in accordance with claim 9 in which said nitrogen is ammoniacal nitrogen.

11. The method in accordance with claim 10 in which said band contains nitrogen and phosphorus in an amount to provide an $N/P_2O_5$ ratio in the range of about 1:2 to about 1:5.

12. A fertilizer composition comprising about 15 to 150 lbs. of phosphorus calculated as available $P_2O_5$, and about ½ to about 4 oz. of a material selected from the group consisting of 2,3,5-triiodobenzoic acid, biologically active metal salts thereof, biologically active ammonium salts thereof, biologically active esters thereof, biologically active amides thereof, and mixtures of the foregoing, calculated as 2,3,5-triiodobenzoic acid equivalent, per unit of said fertilizer.

13. The composition in accordance with claim 12 which includes about 2 to about 30 lbs. of nitrogen calculated as available nitrogen per unit of said fertilizer.

14. The composition in accordance with claim 12 in which said nitrogen is ammoniacal nitrogen.

15. The composition in accordance with claim 14 in which the nitrogen and phosphorus are present in an amount to provide an $N/P_2O_5$ ratio in the range of about 1:2 to about 1:5.

16. The composition in accordance with claim 15 including about 5 to about 100 lbs. of potash calculated as $K_2O$ per unit of said fertilizer.

References Cited

UNITED STATES PATENTS

| | | | |
|---|---|---|---|
| 2,222,015 | 11/1940 | Bateman | 111—1 |
| 2,787,864 | 4/1957 | Eck et al. | 111—1 |
| 3,325,274 | 6/1967 | Anderson | 71—115 |

FOREIGN PATENTS 15,417  1965  Japan.

OTHER REFERENCES

Staniforth et al.: Weeds, vol. 11, No. 1, pages 96 to 98, April 1963.

Peters et al.: Weeds, vol. 9, No. 4, pages 639 to 645, October 1961.

LEWIS GOTTS, Primary Examiner

C. L. MILLS, Assistant Examiner

U.S. Cl. X.R.

71—1, 115

UNITED STATES PATENT OFFICE
CERTIFICATE OF CORRECTION

Patent No. 3,459,532                                        August 5, 1969

Thomas J. Army et al.

It is certified that error appears in the above identified patent and that said Letters Patent are hereby corrected as shown below:

Column 1, line 65, "intensitivity" should read -- insensitivity --. Column 6, line 39, "yelds" should read -- yields --; line 40, "Tablets" should read -- Tables --; in Table 1, under the "Mean" heading, line 28, "43.0" should read -- 53.0 --. Column 9, line 15, "acr" should read -- acre --.

Signed and sealed this 12th day of May 1970.

(SEAL)
Attest:

Edward M. Fletcher, Jr.                          WILLIAM E. SCHUYLER, JR.
Attesting Officer                                        Commissioner of Patents